United States Patent
Röckrath et al.

(10) Patent No.: US 7,019,042 B2
(45) Date of Patent: Mar. 28, 2006

(54) THIXOTROPIC AGENT THAT CAN BE ACTIVATED USING ACTINIC RADIATION, A METHOD FOR ITS PRODUCTION AND THE USE THEREOF

(75) Inventors: Ulrike Röckrath, Senden (DE); Uwe Conring, Dülmen (DE); Hurbert Baumgart, Münster (DE); Ingrid Heid, Münster (DE)

(73) Assignee: BASF Coatings AG, Munster (DE)

( * ) Notice: Subject to any disclaimer, the term of this patent is extended or adjusted under 35 U.S.C. 154(b) by 2 days.

(21) Appl. No.: 10/344,614

(22) PCT Filed: Aug. 22, 2001

(86) PCT No.: PCT/EP01/09696

§ 371 (c)(1),
(2), (4) Date: Feb. 12, 2003

(87) PCT Pub. No.: WO02/18468

PCT Pub. Date: Mar. 7, 2002

(65) Prior Publication Data

US 2003/0180539 A1    Sep. 25, 2003

(30) Foreign Application Priority Data

Aug. 26, 2000 (DE) ................ 100 42 152

(51) Int. Cl.
    *C08K 5/21*    (2006.01)
(52) U.S. Cl. .............. 522/78; 522/104; 252/182.18; 524/728
(58) Field of Classification Search ............. None
    See application file for complete search history.

(56) References Cited

U.S. PATENT DOCUMENTS

| | | | |
|---|---|---|---|
| 3,547,848 A | 12/1970 | Marsh | 260/22 |
| 3,893,956 A | 7/1975 | Brandt | 260/18 |
| 4,169,930 A | 10/1979 | Blount | 528/38 |
| 4,311,622 A | 1/1982 | Buter | 260/18 |
| 4,383,068 A | 5/1983 | Brandt | 526/196 |
| 4,416,941 A | 11/1983 | Barsotti | 428/328 |
| 4,425,468 A | 1/1984 | Makhlouf et al. | 524/710 |
| 4,522,958 A | 6/1985 | Das et al. | 523/212 |
| 4,528,319 A | 7/1985 | Ottavini et al. | 524/540 |
| 4,647,647 A | 3/1987 | Haubennestel et al. | 528/83 |
| 4,677,028 A | 6/1987 | Heeringa et al. | 428/422.8 |
| 4,762,752 A | 8/1988 | Haubennestel et al. | 428/407 |
| 4,833,146 A | 5/1989 | Gebert et al. | 514/263 |
| 4,839,406 A | 6/1989 | Natura et al. | 524/196 |
| 4,851,294 A | 7/1989 | Buter et al. | 428/425.8 |
| 4,851,460 A | 7/1989 | Stranghöner et al. | 523/407 |
| 4,882,408 A | 11/1989 | Blum | |
| 4,965,317 A | 10/1990 | Kania et al. | 525/155 |
| 5,264,486 A | 11/1993 | Piestert | 524/745 |
| 5,391,620 A | 2/1995 | Bederke et al. | 525/123 |
| 5,468,461 A | 11/1995 | Hosoda et al. | 523/435 |
| 5,679,719 A * | 10/1997 | Klemarczyk et al. | 522/13 |
| 5,977,256 A | 11/1999 | Huybrechts et al. | 525/131 |
| 6,111,001 A | 8/2000 | Barancyk et al. | 524/211 |
| 6,136,762 A | 10/2000 | Yoshinari et al. | |
| 6,403,699 B1 | 6/2002 | Röockrath et al. | 524/556 |
| 6,410,646 B1 | 6/2002 | Röckrath et al. | 525/124 |
| 6,630,537 B1 | 10/2003 | Baumgart et al. | |
| 6,649,706 B1 | 11/2003 | Heidi et al. | |
| 6,652,915 B1 | 11/2003 | Baumgart et al. | |
| 6,652,916 B1 | 11/2003 | Baumgart et al. | |
| 6,685,985 B1 | 2/2004 | Boisseau et al. | |
| 2002/0082324 A1 | 6/2002 | Van Heugten et al. | 524/212 |

FOREIGN PATENT DOCUMENTS

| | | |
|---|---|---|
| DE | 16 19 816 | 10/1970 |
| DE | 3726959 | 2/1989 |
| DE | 4423260 | 1/1996 |
| DE | 19811471 | 9/1999 |
| DE | 198 55 152 | 5/2000 |
| DE | 19924170 | 11/2000 |
| DE | 19924171 | 11/2000 |
| DE | 19924172 | 11/2000 |
| DE | 101 18 532 | 10/2002 |
| EP | 0 038 127 | 3/1981 |
| EP | 0 249 201 | 6/1987 |
| JP | 60-120750 | 6/1985 |
| WO | WO 97/12945 | 4/1997 |
| WO | WO 99/05194 | 2/1999 |
| WO | WO 00/32670 | 6/2000 |
| WO | WO02/090414 | 11/2002 |

(Continued)

OTHER PUBLICATIONS

Nielsen; Mechanical Properties of Polymers and Composites; vol. 2; 1974; p. 392.*

(Continued)

*Primary Examiner*—Rachel Gorr

(57) ABSTRACT

A novel thixotropic agent comprising urea crystals which comprises at least one compound containing at least one functional group having at least one bond which can be activated with actinic radiation; a novel process for preparing a thixotropic agent comprising urea crystals by reacting at least one primary and/or secondary amine and/or water with at least one polyisocyanate in a liquid organic medium consisting of or comprising at least one compound containing at least one functional group having at least one bond which can be activated with actinic radiation; and the use of the thixotropic agents to prepare coating materials, adhesives and sealing compounds curable thermally and with actinic radiation.

17 Claims, No Drawings

FOREIGN PATENT DOCUMENTS

| | | |
|---|---|---|
| WO | WO03/000813 | 1/2003 |
| WO | WO03/014233 | 2/2003 |
| WO | WO03/091350 | 11/2003 |

OTHER PUBLICATIONS

Patent Abstract of Japan, Mitsui Toatsu Chem. Inc., JP64-024851 Publication Date Jan. 26, 1989, entitled "Thixotropic polyurethane compostion" pp. 1-2.

Patent Abstract of Japan, Kono Yutaka, JP 11043640 Publication Date Feb. 16, 1999, entitled "Printing Ink Binder", p. 1.

Abstract for SU889614, entitled Structural rubber adhesive—containing butadiene-styrene rubber sodium alkyl-mono sulphonate surfactant, ethylene glycol, water and urea, p. 1, Derwent Accession No. 1982-01817J.

* cited by examiner

THIXOTROPIC AGENT THAT CAN BE ACTIVATED USING ACTINIC RADIATION, A METHOD FOR ITS PRODUCTION AND THE USE THEREOF

CROSS REFERENCE TO RELATED APPLICATIONS

This application is a National Phase Application of Patent Application PCT/EP01/09696 filed on 22 Aug. 2001, which claims priority to DE 100 42 152.0, filed on 26 Aug. 2000.

The present invention relates to a novel thixotropic agent comprising urea crystals, which can be activated with actinic radiation. The present invention additionally relates to a novel process for preparing thixotropic agents comprising urea crystals. Further, the present invention relates to the use of the novel thixotropic agent comprising urea crystals to prepare coating materials, adhesives and sealing compounds curable thermally and with actinic radiation. Moreover, the present invention relates to novel coating materials, adhesives and sealing compounds curable thermally and with actinic radiation which comprise the novel thixotropic agent comprising urea crystals. The present invention also relates to the use of the novel coating materials, adhesives and sealing compounds curable thermally and with actinic radiation to produce novel coatings, adhesive films and seals.

Following their application, coating materials are required to exhibit very good stability in order, first, that they permit the production of comparatively thick coating films and coats without exhibiting the extremely disruptive running, especially on vertical substrates. On the other hand, the viscosity of the coating materials must not be so high that problems arise during application and the applied coating films are no longer able to flow out effectively.

These problems occur to an increased extent with coating materials, especially clearcoats, having a high solids content. However, the use of high-solids coating materials is advantageous on environmental grounds since they emit smaller amounts of volatile organic materials in the course of application and curing. At the same time, these coating materials are also required to produce coats, especially clearcoats, which satisfy all of the requirements of the market in terms of gloss, transparency and clarity, scratch resistance, weathering stability, and yellowing stability.

Comparable problems occur with adhesives and sealing compounds as well.

The rheological characteristics of coating materials may be influenced positively with the aid of thixotropic agents comprising urea crystals. These thixotropic agents are prepared, as is known, in situ from polyisocyanates and amines in the presence of hydroxyl-containing binders. The reason why this is possible is that the hydroxyl groups react more slowly with the isocyanate groups than do the amino groups. By way of example, reference is made to patents DE 23 60 019 B2, DE 23 59 9123 B1, DE 23 59 129 B1, DE 198 11 471 A1, DE 27 51 761 C2, EP 0 192 304 B1, and WO 94/22968. Comparable thixotropic agents and processes for preparing them are described in the patent applications bearing the file references DE 199 24 170.8, 199 24 172.4, and 199 24 171.6, all unpublished at the priority date of the present specification.

A disadvantage of these thixotropic agents and their preparation processes is that they can be used essentially only to prepare coating materials, adhesives and sealing compounds comprising the same binders as used to prepare the thixotropic agents.

There is therefore a need for thixotropic agents which comprise urea crystals but which need not be prepared in situ in the presence of hydroxyl-containing binders but instead may be prepared separately and added to a very wide variety of coating materials, adhesives and sealing compounds, but especially coating materials. The coating materials in question ought to have very good application properties, a very good stability and very good flow and ought to produce coats, especially clearcoats, which satisfy all of the requirements of the market in terms of gloss, transparency and clarity, scratch resistance, weathering stability, and yellowing stability. This also applies, mutatis mutandis, to the adhesives and sealing compounds.

The thixotropic agents comprising urea crystals that have been disclosed to date are used principally for thermally curable coating materials, adhesives and sealing compounds. If the known thermally curable coating materials, adhesives and sealing compounds are to be curable with actinic radiation as well, they must be admixed with constituents, such as binders or reactive diluents, containing groups which can be activated with actinic radiation. These additional constituents, however, may have an unpredictable adverse effect on the rheological characteristics of the coating materials, adhesives and sealing compounds in question.

It is an object of the present invention to find a new thixotropic agent comprising urea crystals which can be activated with actinic radiation and need not be prepared in situ in the presence of the binders of coating materials, adhesives and sealing compounds but instead can be prepared separately and used as needed. The new thixotropic agent, comprising urea crystals and curable with actinic radiation, is to be used to prepare coating materials, adhesives and sealing compounds which can be cured thermally and with actinic radiation. These coating materials, adhesives and sealing compounds ought to have excellent rheological characteristics, very good applications properties, a very good stability, and very good flow, and ought to produce coats, especially clearcoats, which satisfy all of the requirements of the market in terms of gloss, transparency and clarity, scratch resistance, weathering stability, and yellowing stability. The same applies, mutatis mutandis, to the adhesives and sealing compounds.

Accordingly, we have found the novel thixotropic agent comprising urea crystals which comprises at least one compound containing at least one functional group having at least one bond which can be activated with actinic radiation.

In the text below, the novel thixotropic agent comprising urea crystals is referred to as the "thixotropic agent of the invention".

We have also found the novel process for preparing a thixotropic agent, in which at least one primary and/or secondary amine and/or water is reacted with at least one polyisocyanate in a liquid organic medium which consists of or comprises at least one compound containing at least one functional group having at least one bond which can be activated with actinic radiation.

In the text below, the novel process for preparing a thixotropic agent is referred to as the "process of the invention".

We have further found the novel coating materials, adhesives and sealing compounds, curable thermally and with actinic radiation, which comprise at least one thixotropic agent of the invention and/or at least one thixotropic agent prepared by the process of the invention.

In the text below, the novel coating materials, adhesives and sealing compounds curable thermally and with actinic radiation are referred to as the "coating materials, adhesives and sealing compounds of the invention".

Furthermore, we have found the novel coatings, adhesive films and seals producible by thermal curing and curing with actinic radiation from the coating materials, adhesives and sealing compounds of the invention, which are referred to below as the coatings, adhesive films and seals of the invention.

Further subject matter of the invention will emerge from the description.

In the light of the prior art it was surprising and unforeseeable for the skilled worker that the object on which the present invention was based might be achieved with the aid of the thixotropic agent of the invention, since hitherto it was always necessary to prepare the thixotropic agents in the binder or binder solution of the respective coating materials, adhesives and sealing compounds. Even more surprising was that by means of the thixotropic agent of the invention it is possible, simply, to prepare the coating materials, adhesives and sealing compounds of the invention, which have an excellent profile of performance properties, without adversely affecting the rheological characteristics.

The thixotropic agent of the invention comprises at least one compound containing at least one functional group having at least one bond which can be activated with actinic radiation. The compound is preferably liquid.

For the purposes of the present invention, actinic radiation is electromagnetic radiation or corpuscular radiation. Electromagnetic radiation used is preferably near infrared (NIR), visible light, LW radiation and/or X-rays, especially UV radiation, and corpuscular radiation used is preferably electron beams.

In the context of the present invention, a bond which can be activated with actinic radiation is a bond which on exposure to actinic radiation becomes reactive and, with other activated bonds of its kind, undergoes polymerization reactions and/or crosslinking reactions which proceed in accordance with free-radical and/or ionic mechanisms. Examples of suitable bonds are carbon-hydrogen single bonds or carbon-carbon, carbon-oxygen (in the form of epoxide groups, in particular), carbon-nitrogen, carbon-phosphorus or carbon-silicon single or double bonds.

Of these, the carbon-carbon double bonds are particularly advantageous and so are used with very particular preference in accordance with the invention. For brevity, they are referred to below as "double bonds".

Especially suitable double bonds are present, for example, in (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; or dicyclopentadienyl ester, norbornenyl ester, isoprenyl ester, isopropenyl ester, allyl ester or butenyl ester groups, which are referred to collectively as activatable functional groups.

Advantageous compounds contain on average per molecule at least two, preferably at least three, with particular preference at least four, with very particular preference from four to six, and in particular five, functional groups. The activatable functional groups may have the same structure or at least two different structures. Preference is given to the use of one structure or two different structures.

The activatable functional groups preferably contain at least one double bond. Accordingly, an activatable functional group contains one double bond or two, three or four double bonds. If more than one double bond is used, the double bonds may be conjugated. In accordance with the invention, however, it is of advantage if the double bonds are in isolation, especially each terminally, in the activatable functional group. It is particular advantage in accordance with the invention to use two, especially one, double bond(s).

If different activatable functional groups are used, the combinations of (meth)acrylate groups, especially acrylate groups, with vinyl groups and/or allyl groups, or of vinyl groups and allyl groups, are of advantage and are therefore used with preference.

If only one kind of activatable functional groups is used, it is preferred to use (meth)acrylate groups, especially acrylate groups, vinyl groups or allyl groups.

Examples of suitable compounds containing at least one activatable functional group are known from Römpp Lexikon Lacke und Druckfarben, Georg Thieme Verlag, Stuttgart, New York, 1998, "Reactive diluents", pages 491 and 492.

The example of a suitable compound containing five activatable functional groups is dipentaerythritol pentaacrylate. It is a standard commercial compound sold under the brand name Sartomer® 399 by the company Cray Valley, France.

The above-described compounds containing at least one activatable functional group may be used, if they are liquid, as an organic medium in the preparation of the urea crystals. Preferably, at least one inert organic solvent is added to them. The quality "inert" denotes that the organic solvent does not react with the starting compounds of the urea crystals. Examples of suitable inert organic solvents are comparatively high-boiling solvents, which are sold under the brand names Decalin®, Shellsol®, Solvesso®, Kristallöl®, Tetralin®, Isopar®, and Texanol®. The weight ratio of compounds containing at least one activatable functional group to inert organic solvent may vary very widely. Preferably, the amount of the inert organic solvent used is no more than is required to ensure that the resultant organic medium is liquid.

The urea crystals present in the thixotropic agent of the invention are preferably acicular with, in part or in whole, a helical twist. They preferably have a particle size distribution (PSD) of between 0.1 and 6.0 µm. 80% of the urea crystals are <2 µm.

The amount of the urea crystals in the thixotropic agent of the invention may vary widely and is guided in particular by the intended rheological characteristics of the coating materials, adhesives and sealing compounds of the invention. The thixotropic agent of the invention preferably comprises the urea crystals in an amount, based on the thixotropic agent, of from 0.1 to 10, more preferably from 0.2 to 9, with particular preference from 0.3 to 8, with very particular preference from 0.4 to 7, and in particular from 0.5 to 6% by weight.

The thixotropic agent of the invention is preparable by reacting at least one primary and/or secondary amine and/or water with at least one polyisocyanate in the above-described organic medium, the reactants being used preferably in amounts such as to give the amount of urea crystals described above. Preferably, these reactants are reacted with one another in amounts such that the ratio of equivalents between isocyanate-reactive groups and isocyanate groups is between 1.2 and 0.4, preferably between 1.1 and 0.8.

Particularly advantageous thixotropic agents of the invention are obtained if the amines used as starting compounds are primary and/or secondary amines, preferably primary amines, and in particular primary monoamines. Further advantages result from the use of araliphatic or aliphatic primary monoamines, especially aliphatic primary monoamines with at least 6 carbon atoms in the molecule. Examples of suitable primary monoamines are benzylamine, ethylamine, n-propylamine, isopropylamine, n-butylamine, isobutylamine, tert-butylamine, pentylamine, n-hexylamine, n-octylamine, isononylamine, isotridecylamine, n-decylamine, stearylamine, and ethanolamine.

A further possibility is to use primary and secondary acyclic or cyclic amines containing ether groups. These are, for example, morpholine or substances of the general formula $(CH_3-(CH_2)_a-O-(CH_2)_b)_c NH_d$, where a is an integer from 0 to 10, b is an integer from 1 to 20, c is 1 or 2, and the sum of c and d is always 3. Preferably, a=0, b=3, c=1, and d=2 (i.e., methoxypropylamine).

For further details, reference is made to column 3, page 3, lines 25 to 47, of European Patent EP 0 192 304 B1.

Examples of suitable polyisocyanates for use in accordance with the invention are diisocyanates, such as tetramethylene 1,4-diisocyanate, hexamethylene 1,6-diisocyanate, 2,2,4-trimethylhexamethylene 1,6-diisocyanate, omega, omega'-dipropyl ether diisocyanate, cyclohexyl 1,4-diisocyanate, cyclohexyl 1,3-diisocyanate, cyclohexyl 1,2-diisocyanate, dicyclohexylmethane 4,4'-diisocyanate, 1,5-dimethyl-2,4-di(isocyanatomethyl)benzene, 1,5-dimethyl-2,4-di(isocyanatoethyl)benzene, 1,3,5-trimethyl-2,4-di(isocyanatomethyl)benzene, 1,3,5-triethyl-2,4-di(isocyanatomethyl)benzene, isophorone diisocyanate, dicyclohexyldimethylmethane 4,4'-diisocyanate, 2,4-tolylene diisocyanate, 2,6-tolylene diisocyanate, and diphenylmethane 4,4'-diisocyanate.

It is also possible to use polyisocyanates based on the above-described diisocyanates. The corresponding polyisocyanates are oligomers containing isocyanurate, biuret, allophanate, iminooxadiazinedione, urethane, carbodiimide, urea and/or uretdione groups. Examples of suitable preparation processes are known, for example, from patents and patent applications CA 2,163,591 A1, U.S. Pat. No. 4,419,513 A, U.S. Pat. No. 4,454,317 A, EP 0 646 608 A1, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. No. 5,258,482 A, U.S. Pat No. 5,290 902 A, EP 0 649 806 A1, DE 42 29 183 A1, and EP 0 531 820 A1.

Very particular preference is given to using the oligomers of hexamethylene diisocyanate and of isophorone diisocyanate.

The above-described oligomers advantageously have an NCO functionality of 2.0–5.0, preferably 2.2–4.0, in particular 2.5–3.8.

Further examples of suitable polyisocyanates are

Ia) isocyanates having at least one diisocyanate structural unit,
  i) which has an unsaturated or aromatic or nonaromatic ring structure containing 5–10 ring atoms and
  ii) has two isocyanate groups attached to the ring structure, where
  iii) in the case of a nonaromatic ring structure
    a) both isocyanate groups are attached to the ring structure via linear $C_1-C_9$ alkyl and/or linear $C_2-C_{10}$ ether alkyl, or
    b) one isocyanate group is attached directly to the ring structure and the other is attached via linear $C_2-C_9$ alkyl and/or linear $C_2-C_{10}$ ether alkyl, and
  iv) in the case of an unsaturated aromatic structure, at least one of the two isocyanate groups is attached to the ring structure via linear $C_2-C_9$ alkyl and/or linear $C_2-C_{10}$ ether alkyl, neither radical containing benzylic hydrogen atoms;

and/or

Ib) at least one oligomer of this isocyanate Ia) having 2 to 20 isocyanate units, in particular a trimer;

and/or

Ic) at least one partially blocked isocyanate Ia) and/or at least one partially blocked oligomer Ib).

The isocyanates Ia) may have two or more of these diisocyanate structural units, although it has been found appropriate to use only one.

Regarding the diisocyanate structural unit of the diisocyanate Ia) there are various possibilities for its further configuration, which are described below.

As far as the ring structure (i) is concerned it is possible in principle for the rings involved to be heteroatomic rings. In that case the ring atoms present in the ring structure (i) include not only carbon atoms but also ring atoms other than carbon, such as nitrogen, oxygen or silicon atoms, for example. The rings involved may be saturated or unsaturated, or aromatic, heteroatomic rings. Examples of suitable saturated heteroatomic rings are the silacyclopentane, silacyclohexane, oxolane, oxane, dioxane, morpholine, pyrrolidine, imidazolidine, pyrazolidine, piperidine or quinuclidine rings. Examples of suitable unsaturated or aromatic heteroatomic rings are pyrrole, imidazole, pyrazole, pyridine, pyrimidine, pyrazine, pyradazine or triazine rings. It is preferred if the ring atoms present in the ring structure (i) are exclusively carbon atoms.

The ring structure (i) may be free from bridges. Where the ring structure (i) is a bicyclic terpene framework, decalin, adamantane or quinuclidine, however, bridges may be present. Examples of suitable terpene frameworks are carane, norcarane, pinane, camphane or norbornane frameworks.

The hydrogen atoms of a diisocyanate structural unit Ia), especially the ring structure (i), may be substituted by groups or atoms which react neither with isocyanates nor with the amine and/or binder. Examples of suitable groups are nitro, alkyl, cycloalkyl, perfluoroalkyl, perfluorocycloalkyl, and aryl groups. Examples of suitable atoms are halogen atoms, especially fluorine.

The ring structure (i) consists advantageously of 6 carbon atoms, especially in the form of cyclohexane or benzene.

Examples of suitable linear $C_1-C_9$ alkyl are methylene or ethylene and also tri-, tetra-, penta-, hexa-, hepta-, octa- or nonamethylene radicals, especially methylene radicals.

The linear $C_2-C_{10}$ ether alkyls are attached to the ring structure either via the oxygen atoms or via the alkanediyl radicals they contain. Preferably, they are attached to said structure via the oxygen atoms. The indices 2 to 10 denote that there are from 2 to 10 carbon atoms in the ether alkyls.

The ether alkyls may contain only one oxygen atom. It is of advantage if from 2 to 10, in particular from 2 to 5, oxygen atoms are present in the chain. In that case there are 1 or more, but especially 2, carbon atoms between 2 oxygen atoms.

Examples of suitable $C_2-C_{10}$ ether alkyls are
—$(O-CH_2)_m$—, where m=1 to 10,
—$(O-C_2H_4)_p$—, where p=1 to 5,
—$(O-C_3H_6)_q$—, where q=1 to 3 or
—$(O-C_4H_8)_r$—, where r=1 to 2.

If the isocyanate Ia) contains at least one diisocyanate structural unit having a nonaromatic ring structure (i), especially cyclohexane, both isocyanate groups may be attached via —CH$_2$— preferably to positions 1 and 3 of the ring structure. Attachment to the 1,2 and 1,4 positions, however, is also possible. In that case the diisocyanate structural unit or the isocyanate Ia) has, for example, the formula C$_6$H$_{10}$(—CH$_2$—NCO)$_2$.

Alternatively, it is possible for one of the two isocyanate groups to be attached directly to a ring atom of a nonaromatic ring structure (i), especially cyclohexane, and for the second isocyanate group to be attached via C$_2$–C$_9$ alkyl, especially C$_3$ alkyl, to a further ring atom, preferably in 1,2 configuration. In that case the diisocyanate structural unit or the isocyanate Ia) has, for example, the formula C$_6$H$_{10}$(—NCO)(—C$_3$H$_6$—NCO).

If the isocyanate Ia) contains at least one diisocyanate structural unit having an unsaturated or aromatic ring structure (i), especially benzene, both isocyanate groups may be attached to said structure via C$_2$–C$_9$ alkyl. It is important that the alkanediyl radicals contain no benzylic hydrogen atoms, but in their stead carry substituents R$^1$ and R$^2$ which react neither with isocyanates nor with the amine or the binder. Examples of suitable substituents R$^1$ and R$^2$ are C$_1$–C$_{10}$ alkyl, aryl or halogen, preferably —CH$_3$.

Examples of suitable alkanediyl groups are, accordingly, —CR$^1$R$^2$—(CH$_2$)$_n$—, where n=1 to 8, especially 1 to 4, and R$^1$ and R$^2$=the substituents indicated above.

The above-described alkanediyl groups are attached preferably to positions 1 and 3 of the benzene ring. In this case as well, however, attachment to positions 1,2 and 1,4 is possible. In that case, the diisocyanate structural unit or the isocyanate Ia) for use in accordance with the invention has, for example, the formula C$_6$H$_4$(—C(CH$_3$)$_2$—C$_2$H$_4$—NCO)$_2$.

Alternatively, the two isocyanate groups may be connected to the unsaturated or aromatic ring structure, especially benzene, via the above-described C$_2$–C$_{10}$ ether alkyls. It is important that the ether alkyls carry no benzylic hydrogen atoms. Where the ether alkyls are linked to the aromatic ring structure via carbon atoms, this can be achieved by ensuring that the benzylic carbon atoms carry the above-described substituents R$^1$ and R$^2$. If the ether alkyls are linked to the aromatic ring structure via oxygen atoms, no benzylic hydrogen atoms are present, which is why this variant is preferred.

Here again, it is possible for one of the two isocyanate groups to be attached directly to a ring atom of a saturated or aromatic ring structure (i), preferably a benzene ring, and for the second isocyanate group to be attached to a further ring atom, preferably in 1,2 configuration, for example, via C$_3$–C$_9$ alkyl containing no benzylic hydrogen atoms. In that case, the diisocyanate structural unit or the isocyanate Ia) for use in accordance with the invention has, for example, the formula C$_6$H$_4$(—NCO)(—C(CH$_3$)$_2$—(CH$_2$)$_2$—NCO).

Instead of or in addition to the isocyanate Ia) it is possible to use at least one oligomer Ib). The oligomer Ib) is prepared from the isocyanate Ia), the reaction involving advantageously from 2 to 10 monomer units, and trimerization being particularly preferred. The oligomerization and trimerization may lead, using customary and known, suitable catalysts, to the formation of uretdione, biuret, isocyanurate, iminooxadiazinedione, urea and/or allophanate groups. Oligomerization is, however, also possible by reaction with low molecular mass polyols such as trimethylolpropane or homotrimethylolpropane, glycerol, neopentyl glycol, dimethylolcyclohexane, ethylene glycol, diethylene glycol, propylene glycol, 2-methyl-2-propyl-1,3-propanediol, 2-ethyl-2-butyl-1-propanediol, 3,2,2,4-trimethyl-1,5-pentanediol and 2,2,5-trimethyl-1,6-hexanediol, which, where required, are ethoxylated and/or propoxylated—partly, if desired—or otherwise rendered hydrophilic.

In addition to the diisocyanates and/or their oligomers and/or the isocyanates Ia) and/or their oligomers Ib), it is possible to use at least one partially blocked diisocyanate and/or its partially blocked oligomer and/or at least one partially blocked isocyanate Ia) and/or its partially blocked oligomer Ib) (i.e., isocyanate Ic)). Furthermore, instead of the diisocyanates and/or their oligomers and/or the isocyanates Ia) and/or their oligomers Ib), it is possible to use at least one partially blocked oligomer and/or at least one partially blocked oligomer Ib) (i.e., isocyanate Ic)).

For further details, reference is made to page 3, lines 10 to 51, of German Patent DE 198 11 471 A1 or to page 8, lines 4 to 23, of International Patent Application WO 94/22968.

Examples of suitable blocking agents are the blocking agents known from the U.S. Patent U.S. Pat. No. 4,444,954 A, such as i) phenols such as phenol, cresol, xylenol, nitrophenol, chlorophenol, ethylphenol, t-butylphenol, hydroxybenzoic acid, esters of this acid or 2,5-di-t-butyl-4-hydroxytoluene; ii) lactams, such as caprolactam, valerolactam, butyrolactam or propiolactam; iii) active methylenic compounds, such as diethyl malonate, dimethyl malonate, ethyl acetoacetate, methyl acetoacetate or acetylacetone; iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol or acetocyanohydrin; v) mercaptans such as butyl mercaptan, hexyl mercaptan, t-butyl mercaptan, t-dodecyl mercaptan, 2-mercaptobenzothiazole, thiophenol, methylthiophenol or ethylthiophenol; vi) acid amides such as acetoanilide, acetoanisidinamide, acrylamide, methacrylamide, acetamide, stearamide or benzamide; vii) imides such as succinimide, phthalimide or maleimide; viii) amines such as diphenylamine, phenylnaphthylamine, xylidine, N-phenylxylidine, carbazole, aniline, naphthylamine, butylamine, dibutylamine or butylphenylamine; ix) imidazoles such as imidazole or 2-ethylimidazole; x) ureas such as urea, thiourea, ethyleneurea, ethylenethiourea or 1,3-diphenylurea; xi) carbamates such as phenyl N-phenylcarbamate or 2-oxazolidone; xi) imines such as ethyleneimine; xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes; xiv) salts of sulfurous acid such as sodium bisulfite or potassium bisulfite; xv) hydroxamic esters such as benzyl methacrylohydroxamate (BMH) or allyl methacrylohydroxamate; or xvi) substituted pyrazoles, imidazoles or triazoles.

The above-described oligomers Ib) advantageously likewise have an NCO functionality of 2.0–5.0, preferably 2.2–4.0, especially 2.5–3.8.

In the preparation of the thixotropic agent of the invention it is also possible for at least one of the below-described constituents of the coating materials, adhesives and sealing compounds of the invention to be present, in particular at least one binder (cf. Römpp, op. cit., "Binders", pages 73 and 74), at least one of the thermally curable, hydroxyl-containing reactive diluents as described in patents DE 198 09 643 A1, DE 198 40 605 A1, and DE 198 05 421 A1, and/or at least one polyol described in German Patent DE 198 11 471 A1, page 3, line 52 to page 5, line 4.

Moreover, the thixotropic agent of the invention may comprise at least one silica. Hydrophilic and hydrophobic silicas are available commercially, for example, under the trade name Aersosil® and under the product designations 200, R972, R974, R805, and R812 from the company Degussa AG, Hanau, Germany.

Furthermore, the thixotropic agent of the invention may comprise at least one wetting agent. Examples of suitable wetting agents are known from patent application EP 0 154 678 A1 or are sold under the commercial designations Disperbyk® 161 by the company Byk, Borchigel® by the company Bayer AG, and Tego Disperse® 710 by the company Tego Chemie Services.

The thixotropic agent of the invention is used to prepare coating materials, adhesives and sealing compounds of the invention, especially solventborne coating materials, adhesives and sealing compounds of the invention. In the course of this utility the particular advantage of the thixotropic agents of the invention is manifested, namely that they permit the preparation of coating materials, adhesives and sealing compounds of the invention which have a particularly high solids content, with the correspondingly low level of volatile organic constituents, and yet are still always very easy to apply. The solids content, based on the respective coating material or adhesive or sealing compound of the invention, is preferably at least 35, more preferably at least 40, with particular preference at least 45, with very particular preference 50, and in particular at least 55% by weight.

Viewed in terms of its method, the preparation of the thixotropic agent of the invention has no special features but instead takes place continuously or batchwise in customary and known apparatus such as stirred vessels, Ultraturrax or in-line dissolvers in a comparatively high shear field. Preferably, the amines are introduced first, in the organic medium, and the polyisocyanates are metered in.

The amount of the thixotropic agents of the invention in the coating materials, adhesives and sealing compounds of the invention may vary very widely. At the bottom end it is limited only by the need to add the thixotropic agent of the invention in an amount such that its advantageous technical effects are still manifested to the desired and necessary extent. At the top end it is limited by the consideration that the viscosity of the coating materials, adhesives and sealing compounds of the invention must not be so high that trouble-free application and very good flowout are no longer ensured. The thixotropic agent of the invention is used preferably in an amount of from 0.1 to 25% by weight, more preferably from 0.2 to 23% by weight, in particular from 0.6 to 20% by weight, based in each case on the total coating material, adhesive or sealing compound of the invention.

Very particular advantages result when the thixotropic agent of the invention is used to prepare the coating materials of the invention, especially the pigmented solid-color topcoat or basecoat materials of the invention or the unpigmented clearcoat materials of the invention. The advantageous technical effect of the thixotropic agent of the invention are therefore underpinned, by way of example, on the basis of the coating materials of the invention.

The below-described constituents of the coating material of the invention may also be present in the adhesives and sealing compounds of the invention. Similarly, the techniques for its application and its curing may also be transferred to the adhesives and sealing compounds of the invention.

The coating material of the invention is curable thermally and with actinic radiation. This is referred to by those skilled in the art, inter alia, as "dual cure". The coating material is thermally self-crosslinking or externally crosslinking.

In the context of the present invention, the term "self-crosslinking" denotes the property of a binder whereby it undergoes crosslinking reactions "with itself". A prerequisite for this is that the binders already include both kinds of complementary reactive functional groups that are necessary for crosslinking, or reactive functional groups which react "with themselves". "Externally crosslinking", on the other hand, is the term used to refer to those coating materials wherein one kind of the complementary reactive functional groups is present in the binder and the other kind in a curing or crosslinking agent. For further details, reference is made to Römpp, op. cit., "Curing", pages 274 to 276, especially bottom page 275.

The coating material of the invention is a one-component system.

In the context of the present invention, a one-component system is a coating material which cures thermally and with actinic radiation and where the binder and the crosslinking agent are present alongside one another, i.e., in one component. A prerequisite for this is that the two constituents crosslink with one another only at relatively high temperatures and/or on exposure to actinic radiation.

The coating material of the invention is a two-component or multicomponent system.

In the context of the present invention, two-component or multicomponent systems are coating materials whose crosslinking agent, owing to its high reactivity, must be stored separately from other constituents of the coating materials prior to application.

Examples of suitable complementary reactive functional groups for use in accordance with the invention are compiled in the overview below. In the overview, the variable R represents an acyclic or cyclic aliphatic, an aromatic and/or an aromatic-aliphatic (araliphatic) radical; the variables R' and R" represent identical or different aliphatic radicals or are linked with one another to form an aliphatic or heteroaliphatic ring.

Overview: Examples of complementary functional groups

| Binder<br>or<br>Crosslinking agent | Self-crosslinking binder<br>or<br>and crosslinking agent<br>or<br>and binder |
|---|---|
| —SH | —C(O)—OH |
| —NH$_2$ | —C(O)—O—C(O) |

-continued

Overview: Examples of complementary functional groups

| Binder<br><br>Crosslinking agent | Self-crosslinking binder<br>or<br>and<br>or<br>and | crosslinking agent<br><br>binder |
|---|---|---|
| —OH<br>—O—(CO)—NH—(CO)—NH$_2$<br>—O—(CO)—NH$_2$<br>>NH | | —NCO<br>—NH—C(O)—OR<br>—CH$_2$—OH<br>—CH$_2$—O—R<br>—NH—CH$_2$O—R<br>—NH—CH$_2$—OH<br>—N(—CH$_2$—O—R)$_2$<br>—NH—C(O)—CH(—C(O)OR)$_2$<br>—NH—C(O)—CH(—C(O)OR)(—C(O)—R)<br>—NH—C(O)—NR'R"<br>>Si(OR)$_2$<br>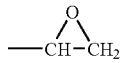 |
| —C(O)—OH | | 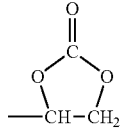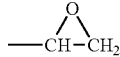<br>—N=C=N—<br>—C(O)—N(CH$_2$—CH$_2$—OH)$_2$ |

The selection of the respective complementary reactive functional groups is guided firstly by the consideration that, during the preparation, storage and application of the coating materials of the invention said groups should not undergo any unwanted reactions, in particular no premature crosslinking, and/or should not inhibit or disrupt, if appropriate, the actinic radiation curing, and secondly by the temperature range within which crosslinking is to take place.

In the case of the one-component systems of the invention, it is preferred to employ crosslinking temperatures from 100 to 180° C. Use is preferably made, therefore, of binders (A) containing thio, hydroxyl, N-methylolamino, N-alkoxymethylamino, imino, carbamate, allophanate and/or carboxyl groups, preferably hydroxyl groups, on the one hand and preferably crosslinking agents (D) containing anhydride, carboxyl, epoxy, blocked isocyanate, urethane, methylol, methylol ether, siloxane, carbonate, amino, hydroxyl and/or betahydroxyalkylamide groups, preferably blocked isocyanate, urethane or alkoxymethylamino groups, on the other.

In the case of self-crosslinking coating materials of the invention, the binders (A) contain in particular methylol, methylol ether and/or N-alkoxymethylamino groups.

Examples of suitable binders are thermally curable, random, alternating and/or block, linear and/or branched and/or comb (co)polymers of ethylenically unsaturated monomers, or polyaddition resins and/or polycondensation resins. Regarding these terms, reference is made to Römpp, op. cit., page 457, "Polyaddition" and "Polyaddition resins (polyadducts)", and also pages 463 and 464, "Polycondensates", "Polycondensation", and "Polycondensation resins".

Furthermore, the abovementioned binders may also include the above-described functional groups having at least one bond which can be activated with actinic radiation. As a result, the binders are curable thermally and with actinic radiation (dual cure).

Examples of highly suitable binders are hydroxyl-containing linear and/or branched and/or block, comb and/or random poly(meth)acrylates or acrylate copolymers, polyesters, alkyds, polyurethanes, acrylated polyurethanes, acrylated polyesters, polylactones, polycarbonates, polyethers, epoxy resin-amine adducts (meth)acrylatediols, partially hydrolyzed polyvinyl esters, and polyureas. Of these, the acrylate copolymers and the polyesters are of advantage and are used with preference in accordance with the invention. Examples of especially preferred acrylate copolymers are described in International Patent Application WO 94/22968, page 2, line 26 to page 7, line 5.

In addition to the above-described dual-cure binders it is also possible to use binders curable solely with actinic radiation, such as (meth)acryloyl-functional (meth)acrylate copolymers, polyether acrylates, polyester acrylates, unsaturated polyesters, epoxy acrylates, urethane acrylates, amino acrylates, melamine acrylates, silicone acrylates, and the corresponding methacrylates.

The amount of the binder in the coating materials of the invention may vary very widely and is guided primarily by the intended use of the respective coating material of the invention. Preferably, the binders are present in an amount, based on the total solids of the coating material, of from 5.0 to 95, more preferably from 10 to 90, with particular preference from 15 to 85, with very particular preference from 20 to 80, and in particular from 25 to 75% by weight.

The coating material of the invention comprises at least one crosslinking agent. They contain the above-described complementary reactive functional groups.

Examples of suitable crosslinking agents which are used in particular in one-component systems are amino resins, as described for example in Römpp, op. cit., page 29, "Amino resins", in the textbook "Lackadditive" [Coatings additives] by Johan Bieleman, Wiley-VCH, Weinheim, New York, 1998, pages 242 ff., in the book "Paints, Coatings and Solvents", second, completely revised edition, eds. D. Stoye and W. Freitag, Wiley-VCH, Weinheim, New York, 1998, pages 80 ff., in patents U.S. Pat. No. 4,710,541 A1 and EP-B-0 245 700 A1, and in the article by B. Singh and coworkers, "Carbamylmethylated Melamines, Novel Crosslinkers for the Coatings Industry", in Advanced Organic Coatings Science and Technology Series, 1991, Volume 13, pages 193 to 207; carboxyl-containing compounds or resins, as described for example in patent DE 196 52 813 A1; resins or compounds containing epoxide groups, as described for example in patents EP 0 299 420 A1, DE 22 14 650 B1, DE 27 49 576 B1, U.S. Pat. No. 4,091,048 A1, and U.S. Pat. No. 3,781,379 A1; blocked polyisocyanates, as described for example in patents U.S. Pat. No. 4,444,954 A1, DE 196 17 086 A1, DE 196 31 269 A1, and EP 0 004 571 A1; and/or tris(alkoxycarbonylamino)triazines, as described in patents U.S. Pat. No. 4,939,213 A1, U.S. Pat. No. 5,084,541 A1, U.S. Pat. No. 5,288,865 A1, and EP 0 604 922 A1. Examples of suitable blocking agents and suitable polyisocyanates are those described above.

Examples of suitable crosslinking agents which are used in particular in two-component or multicomponent systems are the polyisocyanates described above. Also suitable are polyisocyanates containing not only the free isocyanate groups but also at least one of the above-described activatable functional groups. As is known, these dual-cure polyisocyanates are prepared by reacting polyisocyanates with at least one compound containing at least one isocyanate-reactive functional group, especially a hydroxyl group, and at least one of the above-described activatable functional groups.

Examples of suitable compounds of this kind are allyl alcohol or 4-butyl vinyl ether;

hydroxyalkyl esters of acrylic acid or of methacrylic acid, especially of acrylic acid, which are obtainable by esterifying aliphatic diols, for example, the above-described low-molecular-weight diols B), with acrylic acid or methacrylic acid or by reacting acrylic acid or methacrylic acid with an alkylene oxide, especially hydroxyalkyl esters of acrylic acid or methacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl, bis(hydroxymethyl)cyclohexane acrylate or methacrylate; of these, 2-hydroxyethyl acrylate and 4-hydroxybutyl acrylate are particularly advantageous and are therefore used with particular preference in accordance with the invention; or reaction products of cyclic esters, such as epsilon-caprolactone, for example, and these hydroxyalkyl or hydroxycycloalkyl esters.

The polyisocyanates are reacted with these compounds in a molar ratio such that on average there is or are at least one, preferably at least two, more preferably at least three, with particular preference at least four, with very particular preference at least five, and in particular six, remaining free isocyanate group(s) per molecule.

Furthermore, the coating material of the invention may comprise color and/or effect pigments (cf. Römpp, op. cit., "Effect pigments", page 176, "Metal oxide-mica pigments" to "Metal pigments", pages 380 and 381, "Iron blue pigments" to "Black iron oxide", pages 180 and 181, "Pigments" to "Pigment volume concentration", pages 451 to 453, "Thioindigo pigments", page 563, and "Titanium dioxide pigments", page 567); organic and inorganic, transparent or opaque fillers (cf. Römpp, op. cit., "Fillers", pages 250 ff.); nanoparticles; the above-described thermally curable reactive diluents; additional reactive diluents curable with actinic radiation (cf. Römpp, op. cit., "Reactive diluents", pages 491 and 492); UV absorbers; light stabilizers; free-radical scavengers; thermally labile free-radical initiators; photoinitiators, such as those described in Römpp, op. cit., pages 444 to 446; thermal crosslinking catalysts; devolatilizers; slip additives; polymerization inhibitors; defoamers; emulsifiers; wetting agents; dispersants; adhesion promoters; flow control agents; film-forming auxiliaries; rheology control additives (thickeners); flame retardants; siccatives; dryers; antiskinning agents; corrosion inhibitors; waxes, and flatting agents.

Further examples of suitable additives of the kind described above are detailed in the textbook "Lackadditive" by Johan Bieleman, Wiley-VCH, Weinheim, New York, 1998.

The additives are used in customary and known, effective amounts. The clearcoat materials of the invention, of course, contain no color and/or effect pigments or hiding fillers.

The above-described binders and additives may also be present in the adhesives and sealing compounds of the invention, provided they are suitable for this purpose, which is something the skilled worker can easily determine on the basis of his or her general knowledge of the art.

The preparation of the coating materials of the invention has no special features but instead takes place in a customary and known manner by mixing of the above-described constituents in appropriate mixing equipment such as stirred vessels, dissolvers, stirred mills, or extruders.

The coating material of the invention is outstandingly suited to the production of multicoat color and/or effect coating systems on primed and unprimed substrates by the wet-on-wet technique. Furthermore, the coating material of the invention, especially the solid-color topcoat of the invention, is outstandingly suited to the production of single-coat color and/or effect coating systems.

In its utility as a clearcoat material of the invention, the coating material of the invention exhibits particular advantages as part of the wet-on-wet technique, in which a basecoat material is applied to the primed or unprimed substrate and dried, but not cured, the clearcoat material is then applied to the basecoat film, and the resultant clearcoat film is cured together with the basecoat film, thermally and with actinic radiation (dual cure).

Suitable coating substrates include all surfaces which are not damaged by curing of the films present thereon under the combined application of heat and actinic radiation (dual cure).

Suitable substrates comprise, in particular, metals, plastics, wood, ceramic, stone, textile, fiber composites, leather, glass, glass fibers, glass wool, rockwool, mineral- and resin-bound building materials, such as plasterboard and cement slabs or roofing tiles, and also assemblies of these materials.

Accordingly, the multicoat systems of the invention are also suitable for applications outside of the OEM finishing and refinishing of automobiles. In this sense they are suitable in particular for the coating of furniture, doors and windows, interior and exterior constructions, and for industrial coating, including coil coating and container coating, or the coating of electrical components. In the context of industrial coating, they are suitable for coating virtually all parts for private or industrial use, such as radiators, domestic appliances, small metal parts such as nuts and bolts, hubcaps, rims, packaging, or coils or windings of stators and rotors of electric motors.

In the case of electrically conductive substrates it is possible to use primers, which are produced in a customary and known manner from electrodeposition coating materials. Both anodic and cathodic electrodeposition coating materials are suitable for this purpose, but especially cathodics. Normally, and especially in automotive finishing, a surfacer coat or antistonechip primer is applied to the electrocoat as well, and may be considered as part of the primer system.

It is also possible to coat, bond or seal primed or unprimed plastics parts made, for example, of ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviations to DIN 7728P1). Unfunctionalized and/or nonpolar substrate surfaces may be subjected to conventional pre-coating treatment, such as with a plasma or by a flaming, or may be given a water-based primer.

The coating materials of the invention may be applied by any standard method, such as spraying, knifecoating, brushing, flowcoating, dipping, impregnating, trickling, or rolling, for example. The substrate to be coated may itself be at rest, with the application device or unit being moved. Alternatively, the substrate to be coated, especially a coil, may be moved, with the application unit being at rest relative to the substrate or being moved appropriately. Where the clearcoat materials of the invention include constituents which can be activated with actinic radiation, application is conducted preferably in the absence of light.

In the context of the wet-on-wet technique of the invention, these application methods may of course also be used to apply the surfacers or antistonechip primers and the basecoat materials, and for the solid-color topcoats as well in the context of solid-color topcoating.

Possibly following a certain rest period, which is used for the films to flow out and/or for volatile constituents to evaporate, the applied basecoat films and clearcoat films may be cured in a customary and known manner, thermally, or thermally and with actinic radiation.

In terms of method, the thermal curing has no special features; instead, the customary and known temperatures in the range from room temperature to 200, preferably 190, more preferably 180, with particular preference 170, with very particular preference 160, and in particular 150° C., are employed. The curing temperatures are guided first by whether the system involved is a one-component or a two-component or multicomponent system and secondly by the thermal stability of the substrate used in each case. In every case, however, it is necessary to employ a curing temperature which ensures that the urea crystals in the thixotropic agent of the invention melt before and/or in the course of curing, so that they cannot lead to clouding or other defects in the coatings of the invention.

Preference is given to the use of curing times in the range from one minute to three hours and of apparatus such as radiant heaters or forced air ovens.

The curing with actinic radiation also has no special features in terms of method, but instead takes place in the customary and known manner by irradiation with UV lamps and/or electron beam sources, preferably under inert gas. The dose employed is preferably from 1000 to 2000, more preferably from 1100 to 1900, with particular preference from 1200 to 1800, with very particular preference from 1300 to 1700, and in particular from 1400 to 1600 mJ/cm$^2$. The rate of advance here is preferably from 1.0 to 10, more preferably from 1.2 to 9, with particular preference from 1.6 to 8, with very particular preference from 1.8 to 7, and in particular from 2.0 to 6 m/min.

In the case of joint curing of the clearcoat films of the invention with the basecoat films, the thermal curing and actinic radiation curing may be employed simultaneously or in alternation. Where the two curing methods are used in alternation, it is possible, for example, to commence with thermal curing and end with actinic radiation curing. In other cases, it may prove advantageous to commence and to end with actinic radiation curing. The skilled worker is able to determine the curing method most advantageous for the particular instance on the basis of his or her general knowledge of the art, with or without the assistance of simple preliminary tests.

In this context it is found to be a further particular advantage of the clearcoat materials of the invention that, in the context of the wet-on-wet technique, all customary and known basecoat materials (cf., for example, patents EP 0 089 497 A1, EP 0 256 540 A1, EP 0 228 003 A1, EP 0 397 806 A1, DE 43 28 092 A1, EP 0 522 420 A1, EP 0 522 419 A1, WO 97/49745, WO 97/49747, EP 0 401 565 A1, EP 0 730 613 B1, and WO 95/14721) may be combined with the clearcoat film of the invention.

Within the multicoat system of the invention, the thickness of the individual coats may vary widely. In accordance with the invention, however, it is of advantage if the basecoat film has a thickness of from 5 to 25 µm, in particular from 7 to 20 µm, and the clearcoat film has a thickness of from 15 to 120 µm, preferably from 30 to 80 µm, and in particular from 40 to 60 µm.

The coating materials, adhesives and sealing compounds of the invention may be applied without problems to vertical faces without any runs occurring.

The coatings produced with the aid of the process of the invention, especially the single-coat and multicoat clearcoats and color and/or effect coatings are of the utmost optical quality as regards color, effect, gloss, and DOT (distinctness of the reflected image), have a smooth, hard, flexible, and scratch-resistance surface which is unstructured, in particular being free of runs, are odorless, weathering-stable, chemical-resistant and etch-resistant, do not yellow, and show no cracking or delamination of the coats.

The adhesive films of the invention produced from the adhesives of the invention are of particularly high bond strength, which is retained even under rapidly changing and/or extreme climatic conditions. The same applies, in terms of their sealing effect, to the seals produced from the sealing compounds of the invention. In this case, their stability with respect to aggressive substances is emphasized.

The primed or unprimed substrates coated with the coatings of the invention, bonded with the adhesive films of the invention and/or sealed with the seals of the invention therefore have a particularly long service life and a particularly high utility, so making them especially attractive from a technical and economic standpoint for producers, processors and end-users alike.

EXAMPLES

Preparation Example 1

The Preparation of a Binder for Inventive Use

A laboratory reactor having a useful volume of 4 l, equipped with a stirrer, a dropping funnel for the monomer feed and a dropping funnel for the initiator feed, a nitrogen inlet pipe, a thermometer and a reflux condenser was charged with 650 parts by weight of an aromatic hydrocarbon fraction having a boiling range from 158 to 172° C. The solvent was heated to 140° C., after which a monomer mixture of 652 parts by weight of ethylhexyl acrylate, 383 parts by weight of hydroxyethyl methacrylate, 143 parts by weight of styrene, 213 parts by weight of 4-hydroxybutyl acrylate and 21 parts by weight of acrylic acid, over four hours, and an initiator solution comprising 113 parts by weight of tert-butylperethylhexanoate and 113 parts by weight of the aromatic solvent, over four and a half hours, were metered in at a uniform rate at 140° C. with stirring. The feed streams were commenced simultaneously. After the end of the initiator feed, the editing mixture was held at 140° C. for two hours and then cooled. The reaction mixture was diluted with a mixture of 1-methoxypropyl 2-acetate, butyl glycol acetate and butyl acetate. The resultant binder solution had a solids content of 65% by weight (1 h/130° C.) and an acid number of 15 mg KOH/g.

Example 1

Preparation of an Inventive Thixotropic Agent 459 parts by weight of dipentaerythritol pentaacrylate (Sartomer® 399), 11.8 parts by weight of benzylamine and 60 parts by weight of solvent naphtha® were weighted out into a suitable inline dissolver and mixed at 2500 revolutions per minute for five minutes. 9.2 parts by weight of hexamethylene diisocyanate in 60 parts by weight of solvent naphtha® II were metered into the mixture over two minutes. Following the precipitation of the urea crystals, the thixotropic agent was sheared at 2500 revolutions per minute for 15 minutes. It consisted of 76.5% by weight dipentaerythritol pentaacrylate, 3.5% by weight urea crystals and 20% by weight solvent.

Example 2

The Preparation of an Inventive Two-Component Clearcoat Material

To prepare the inventive two-component clearcoat material, first of all, 35.9 parts by weight of the binder solution from Preparation Example 1, 20 parts by weight of the inventive thixotropic agent from Example 1, 2.0 parts by weight of Irgacure® 184 (standard commercial photoinitiator), 1 part by weight of Genocure® (standard commercial photoinitiator), 0.5 part by weight of Lucirin® TPO (standard commercial photoinitiator), 0.4 part by weight of Byk® 306 (standard commercial leveling agent), 2 parts by weight of Tinuvin® 292 and 400 (standard commercial light stabilizer), 27.4 parts by weight of butyl acetate and 10.8 parts by weight of solvent naphtha II were mixed with one another and homogenized.

Shortly before application, 30 parts by weight of a polyisocyanate containing acrylate groups (isocyanato acrylate based on hexamethylene diisocyanate trimer and hydroxyethyl acrylate, with an isocyanate content of 12% by weight; Roskydal UA VPLS 2337 from Bayer AG) were added to the resultant thixotroped binder component (100 parts by weight), after which the resultant mixture was homogenized.

Comparative Experiment C1

The Preparation of a Noninventive Two-Component Clearcoat Material

Example 2 was repeated except that 20 parts by weight of a solution of 459 parts by weight of Sartomer 399 in 141 parts by weight of solvent naphtha II were used instead of the inventive thixotropic agent of Example 1.

Example 3 and Comparative Experiment C2

The Production of an Inventive (Example 3) and a Noninventive (Comparative Experiment C2) Multicoat Color and Effect Coating System To prepare the stainless steel bodywork test panels for Example 3 and the Comparative Experiment C2, the panels were coated in succession with an electrodeposition coating material in a film thickness of from 18 to 22 μm (baked at 170° C. for 20 minutes) and an aqueous surfacer in a film thickness of from 35 to 40 μm (baked at 160° C. for 20 minutes). Subsequently, a black aqueous basecoat material was applied in a film thickness of from 12 to 15 μm and flashed off at 80° C. for 15 minutes.

Subsequently, in a first experimental series, the inventive clearcoat material was applied to the aqueous basecoats, and the resultant clearcoat films in the case of Example 3, were flashed off at room temperature for 5 minutes and cured with UV radiation (dose: 1500 mJ/cm$^2$; rate of advance: 4.5 m/min) at 80° C. for 15 minutes and thermally at 140° C. for 20 minutes.

For Comparative Experiment C2, Example 3 was repeated but using the noninventive clearcoat material of Comparative Experiment C1 instead of the inventive clearcoat material of Example 2.

The resultant clearcoats had a dry film thickness of 40 μm. Important performance properties of the multicoat systems of Example 3 and of Comparative Experiment C2 are given in the table.

TABLE

Performance properties of the inventive multicoat system of Example 3 and and of Comparative Experiment C2

| Properties | Example: 3 | Comparative Experiment: C2 |
|---|---|---|
| Universal hardness at 25.6 N | 105.4 | 108.1 |
| Standard deviation of the universal hardness | 2.9 | 1.4 |
| Flowout | satisfactory | satisfactory |
| Popping defects | none | none |
| Cross-cut with Tesa tearoff to DIN EN ISO 2409: | GT 0 | GT 0 |
| Gloss (20°): | 89.7 | 89.5 |

The experimental results of Table 1 show that in this dry film thickness the inventive clearcoat is equal to the noninventive clearcoat and meets all of the requirements of practice.

The essential difference between the inventive clearcoat and the noninventive clearcoat became evident when, in a second experimental series, the inventive clearcoat material of Example 2, in the case of Example 3, and the noninventive clearcoat material of Comparative Experiment C1, in the case of Comparative Experiment C2, were applied in the form of a wedge.

For this purpose, metal panels measuring 30×60 cm with a vertical row of holes were coated by pneumatic application, using a gravity-feed gun, and cured. A measurement was made of the film thickness at which the runs, measured from the edge of the hole, reach a length of 1 cm.

In this case, runs of 1 cm were observed from a dry film thickness of 33 μm in the case of the noninventive clearcoat of Comparative Experiment C2. In contrast, this was the case only from a dry film thickness of 50 μm in the case of the inventive clearcoat of Example 3.

What is claimed is:

1. A thixotropic agent comprising
   urea crystals, and
   a liquid organic medium comprising at least one compound comprising at least one activatable functional groups per molecule, said activatable functional group comprising at least one bond that can be activated with actinic radiation,
   wherein the urea crystals have a particle size distribution such that 80% of the urea crystals are smaller than 2μm, and the at least one bond comprises carbon-carbon double bonds that are present in at least one of a (meth)acrylate group, an ethacrylate group, a crotonate group, a cinnamate group, a vinyl ether group, a vinyl ester group, a dicyclopentadienyl group, a norbornenyl group, an isoprenyl group, an isopropenyl group, an allyl group, a butenyl group, a dicyclopentadienyl ether group, a norbornenyl ether group, an isoprenyl ether group, an isopropenyl ether group, an allyl ether group, a butenyl ether group, a dicyclopentadienyl ester group, a norbornenyl ester group, an isoprenyl ester group, an isopropenyl ester group, an ally ester group, and a butenyl ester group.

2. The thixotropic agent of claim 1, wherein the thixotropic agent is prepared by a process comprising reacting at least one of a primary amine, a secondary amine, and water with at least one polyisocyanate in the liquid organic medium.

3. A process for preparing a thixotropic agent comprising urea crystals, comprising
   reacting at least one of a primary amine, a secondary amine, and water with at least one polyisocyanate in a liquid organic medium comprising at least one compound comprising at least one activatable functional groups per molecule, said each activatable functional group comprising at least one bond that can be activated with actinic radiation, wherein the urea crystals have a particle size distribution such that 80% of the urea crystals are smaller than 2μm, and the at least one bond comprises carbon-carbon double bonds that are present in at least one of a (meth)acrylate group, an ethacrylate group, a crotonate group, a cinnamate group, a vinyl ether group, a vinyl ester group, a dicyclopentadienyl group, a norbornenyl group, an isoprenyl group, an isopropenyl group, an allyl group, a butenyl group, a dicyclopentadienyl ether group, a norbornenyl ether group, an isoprenyl ether group, an isopropenyl ether group, an ally ether group, a butenyl ether group, a dicyclopentadienyl ester group, a norbornenyl ester group, an isoprenyl ether group, an isopropenyl ether group, an ally ether group, and a butenyl ester group.

4. The thixotropic agent of claim 1, wherein the actinic radiation comprises electromagnetic radiation or corpuscular radiation.

5. The thixotropic agent of claim 4, wherein the electromagnetic radiation comprises at least one of near infrared (NIR), visible light, UV radiation, and X-ray, and the corpuscular radiation comprises electron beams.

6. The thixotropic agent of claim 1, wherein the carbon-carbon double bonds are present in at least one of an allyl group, a vinyl group, and an acrylate group.

7. The thixotropic agent of claim 1, wherein the activatable functional groups comprise terminally isolated carbon-carbon double bonds.

8. The thixotropic agent of claim 6, wherein the compound comprises from 4 to 6 acrylate groups per molecule.

9. The thixotropic agent of claim 8, wherein the compound comprises dipentaerythritol pentaacrylate.

10. The thixotropic agent of claim 1, wherein the urea crystal are acicular, and, at least partially, have a helical twist and have a particle size less than 6.0 μm.

11. The thixotropic agent of claim 1, wherein the urea crystals are present in the thixotropic agent in an amount, based on the weight of the thixotropic agent, of from 0.1 to 10% by weight.

12. A method comprising adding the thixotropic agent of claim 1 to a coating material that is curable thermally and with actinic radiation.

13. A composition comprising the thixotropic agent of claim 1, wherein the composition is one of a coating material, an adhesive, and a sealing compound, and the composition is curable thermally and with actinic radiation.

14. The composition of claim 13, wherein the composition is one or a multicomponent system, a self-crosslinking one-component system, and an externally crosslinking one-component system.

15. A method comprising applying the composition of claim 13 to at least one of on and in a substrate.

16. The method of claim 15 further comprising forming one of an automotive OEM finish, an automotive refinish, an interior construction coating, an exterior construction coating, a furniture coating, a window coating, a door coating, an industrial coating, a container coating, a coil coating, and an electrical component coating.

17. A material that is prepared by a method comprising applying the composition of claim 13 to at least one of on and in a substrate and curing the composition with heat and actinic radiation, wherein the material is one of a coating, an adhesive film, and a seal.

* * * * *